(12) United States Patent
Zipperer

(10) Patent No.: US 11,243,894 B2
(45) Date of Patent: Feb. 8, 2022

(54) METHOD FOR PROTECTING MEMORY AGAINST UNAUTHORIZED ACCESS

(71) Applicant: TEXAS INSTRUMENTS INCORPORATED, Dallas, TX (US)

(72) Inventor: Johann Zipperer, Unterschleissheim (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/812,660

(22) Filed: Mar. 9, 2020

(65) Prior Publication Data

US 2020/0272581 A1 Aug. 27, 2020

Related U.S. Application Data

(60) Continuation of application No. 16/019,715, filed on Jun. 27, 2018, now Pat. No. 10,585,810, which is a continuation of application No. 15/600,815, filed on May 22, 2017, now Pat. No. 10,037,287, which is a division of application No. 12/563,712, filed on Sep. 21, 2009, now Pat. No. 9,690,718.

(60) Provisional application No. 61/141,907, filed on Dec. 31, 2008.

(51) Int. Cl.
*G06F 12/14* (2006.01)
*G06F 21/53* (2013.01)

(52) U.S. Cl.
CPC .......... *G06F 12/1425* (2013.01); *G06F 21/53* (2013.01)

(58) Field of Classification Search
CPC .............................. G06F 12/1425; G06F 21/53

USPC ......................................................... 711/163
See application file for complete search history.

(56) References Cited

U.S. PATENT DOCUMENTS

| | | | |
|---|---|---|---|
| 4,916,670 | A | 4/1990 | Suzuki et al. |
| 4,922,457 | A | 5/1990 | Mizukami |
| 5,535,409 | A | 7/1996 | Larvoire et al. |
| 5,619,670 | A | 4/1997 | Shindo |
| 5,949,702 | A | 9/1999 | Kachi |
| 6,078,527 | A | 6/2000 | Roth et al. |
| 7,917,716 | B2 | 3/2011 | Berenbaum et al. |
| 8,156,298 | B1 | 4/2012 | Stubblefield |
| 2003/0023822 | A1 | 1/2003 | Scott et al. |
| 2004/0105336 | A1 | 6/2004 | Choi et al. |
| 2006/0015749 | A1 | 1/2006 | Mittal |
| 2007/0156987 | A1 | 7/2007 | Chen et al. |
| 2008/0155188 | A1 | 6/2008 | Courcambeck et al. |
| 2009/0210644 | A1 | 8/2009 | Batifoulier et al. |

FOREIGN PATENT DOCUMENTS

| | | |
|---|---|---|
| DE | 4303406 | 8/1993 |
| DE | 19709975 | 4/1999 |

*Primary Examiner* — Hua J Song
(74) *Attorney, Agent, or Firm* — Brian D. Graham; Charles A. Brill; Frank D. Cimino

(57) ABSTRACT

A method of protecting software for embedded applications against unauthorized access is disclosed. Software to be protected is loaded into a protected memory area and access to the protected memory area is controlled by sentinel logic circuitry. The sentinel logic circuitry allows access to the protected memory area only either from within the protected memory area or from outside of the protected memory area but through a dedicated memory location within the protected memory area. The dedicated memory location then points to protected address locations within the protected memory area.

18 Claims, 2 Drawing Sheets

METHOD FOR PROTECTING MEMORY AGAINST UNAUTHORIZED ACCESS

CROSS REFERENCE TO RELATED APPLICATIONS

This application is a continuation of U.S. patent application Ser. No. 16/019,715, filed Jun. 27, 2018, which is a continuation of U.S. patent application Ser. No. 15/600,815, filed May 22, 2017 and now U.S. Pat. No. 10,037,287, which is a divisional of U.S. patent application Ser. No. 12/563,712, filed Sep. 21, 2009 and now U.S. Pat. No. 9,690,718, which claims priority to U.S. Provisional Application Ser. No. 61/141,907, filed on Dec. 31, 2008, all of which are incorporated herein by reference.

TECHNICAL FIELD

The technical field of this disclosure relates to methods for protecting software of embedded applications against unauthorized access.

BACKGROUND

This section is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, it should be understood that these statements are to be read in this light, not as admissions of prior art.

Embedded applications using programmable devices such as microcontrollers require software to operate. Software (SW) and the intellectual property (IP) behind it is part of the whole solution and collectively represent a monetary value that may need to be protected. The interest to protect this IP may come from the implementer of a device or from a third party software vendor that sells a particular IP.

Conventional solutions rely on "fusing" or laser cutting of circuit traces to protect software IP in particular memory areas from unauthorized access. Other solutions use an authentication process with simple keys or sometimes rolling keys that allows access only after a successful authentication.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This invention allows using protected software IP as a function or an abstract service while the SW itself, such as the applied methods, routines and etc., remains protected. This invention protects software for embedded applications against unauthorized access. The software to be protected is loaded into a protected memory area. Access to the protected memory area is controlled by sentinel logic circuitry. The sentinel logic circuitry allows access to the protected memory area only from within the protected memory area or from outside of the protected memory area but through a dedicated memory location within the protected memory area. The dedicated memory location then points to protected address locations within the protected memory area.

In the invention, a logic circuit that can be a state machine identifies the origin of code execution and decides if access to protected area is granted.

Several mechanisms operate independently of each other and allow independent IPs to execute in a protected environment. In advanced implementations of the invention those mechanisms may be nested and share the same memory regions. This allows higher protection levels, such as a box in a box method, or grouping of IPs in safe containers.

Still another aspect of the invention is an access control circuit used with sentinel logic circuitry. The access control circuit includes an address decoder with inputs to which higher address bits are applied and an output that issues a range signal when an address including these address bits is within a predefined address range. The address decoder may also issue a zero-area signal when an address points to a dedicated memory location within the protected memory area pointing to protected address locations within the protected memory area. In one disclosed implementation the logic circuit includes sentinel logic circuitry with a flip-flop that latches this zero-area signal and logic gates that combine this latched zero-area signal with a range signal from the address decoder decoding a following address. This causes the flip-flop to issue a status signal indicative of a memory access into the protected memory area from within the protected memory area. This status signal is used to decide whether access to a protected memory area is allowed.

Whenever an access to a protected memory area is made by an instruction residing outside of the protected memory area the status signal will be low and access will be denied unless the address to be accessed is a dedicated zero area within the protected memory area. When an access to a protected memory area is made by an instruction residing inside the protected memory area the status signal will be high and access will be allowed. Thus the zero area in the protected memory area is an "entry door" to the protected memory area since access to the protected memory area is only possible by first accessing the zero area. The zero area would typically be the bottom address of the protected memory area and contain pointers to functions of the protected IP. The application using the protected IP from the protected memory area would know and use the address of the zero area and would thus access that address and subsequently use protected functions without having to know their addresses in the protected memory area.

In an implementation with plural nested protected memory areas, the logic circuit includes plural sentinel logic circuits. Each sentinel logic circuit protects software stored in an associated one of a plurality of protected memory areas. Each sentinel logic circuit issues a status signal indicative of a memory access into a respective protected memory area from within the respective protected memory area. An OR gate combines the status signals issued by these sentinel logic circuits into an output signal indicating a memory access into any of the protected memory areas from within any of the protected memory areas.

The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure are described below. These embodiments are only examples of the presently disclosed techniques. Additionally, in an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

Figure 1:
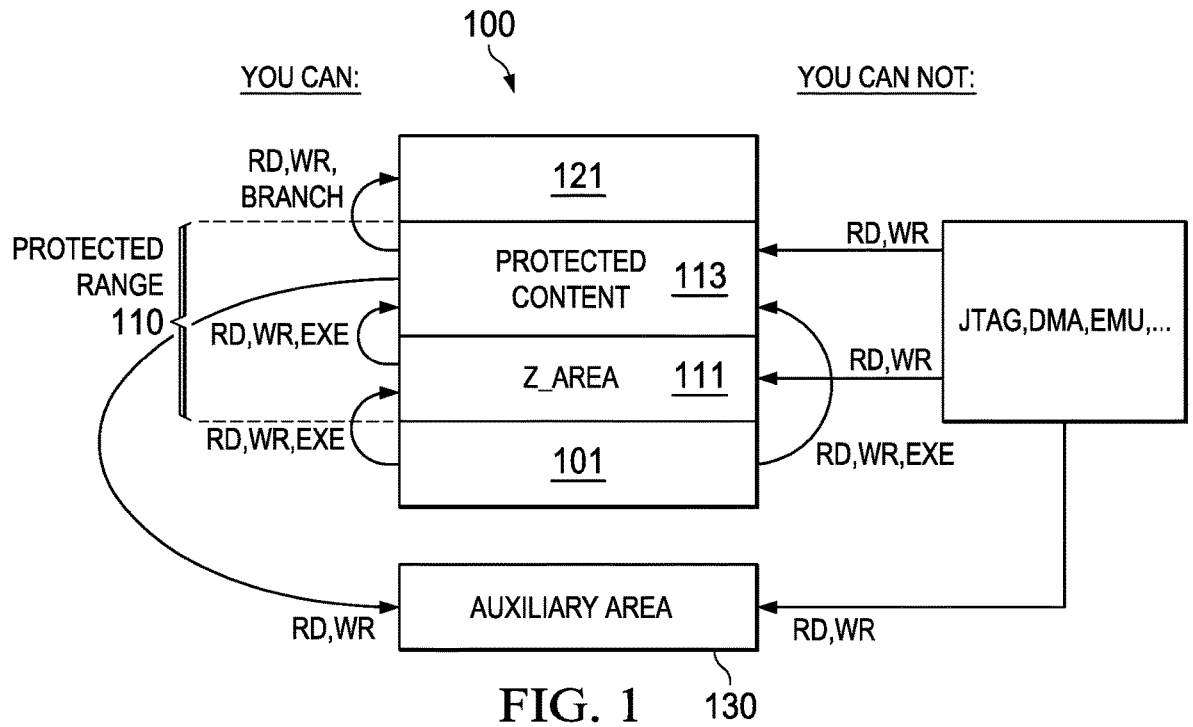
FIG. 1 is a schematic diagram of a memory including a protected area including contents to which access is restricted in accordance with an embodiment of this disclosure.

FIG. 1 illustrates a typical memory 100 of a programmed device such as a microcontroller. Memory has a non-protected bottom area 101. On top of bottom area 101, memory 100 has a protected memory area 110 which consists of a Z_area 111 and an area storing protected content 113 at higher memory addresses than Z_area 111. Z_area 111 contains pointers to address locations within protected content 113. Protected content 113 in turn contains software (SW) representing a valuable content to be protected from unauthorized access. At memory addresses above protected range 110, memory 100 typically contains a non-protected top area 121.

Optionally, a separate auxiliary area 130 can be reached by read and read/write accesses from protected content 113 and is thus tied into the entire protected memory area 110.

The left-hand side of FIG. 1 ("YOU CAN:") notes permitted access routes between various memory areas indicated by arrows. Annotations on the arrows denote permitted read, write, execute and branch instructions associated with that access. Instructions within non-protected bottom area 101 may read, write or execute into Z_area 111. Instructions within Z_area 111 may read, write or execute into protected content 113. Instructions within protected content 113 may read, write or branch into non-protected top area 121. Instructions within protected content 113 may read or write into auxiliary area 130.

The right-hand side in FIG. 1 ("YOU CAN NOT:") notes denied access routes between various memory areas indicated by arrows. Instructions within non-protected bottom area 101 may not read, write, or execution into protected content 113. Operations within a JTAG test interface, a direct memory access (DMA) or an emulation unit (EMU) may not read or write into Z_area 111, protected content 113 or auxiliary area 130.

Figure 2:
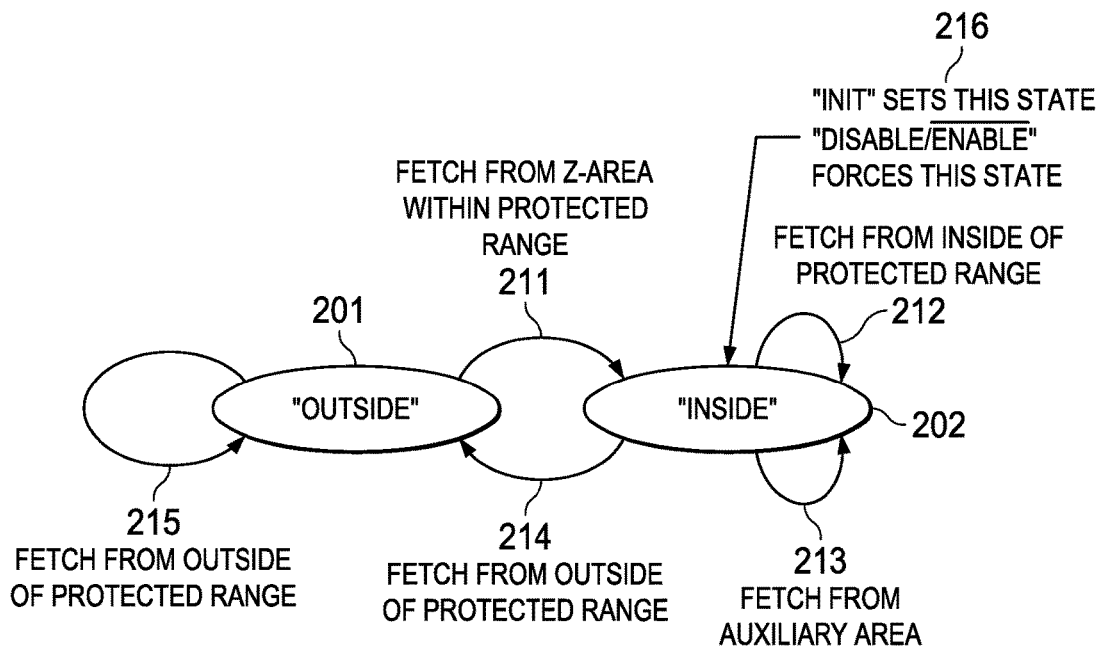
FIG. 2 is a schematic diagram of a state machine model representing operation of sentinel logic circuitry in accordance with an embodiment of this disclosure.

FIG. 2 illustrates a state diagram of the inventive method in accordance with the present disclosure. The sentinel logic circuitry detailed below contains a flip-flop that is used to implement the two status signal states: Outside 201 and Inside 202. Outside 201 indicates that code execution is done from outside of a protected memory area. Inside 202 indicates that code execution is done from within a protected memory area.

FIG. 2 shows that, when the current state is Outside 201, to get from Outside 201 to Inside 202 requires a fetch from Z_area 111 via path 211. After this, consecutive fetches from inside the whole protected range 110 (including Z_area 111) via path 212 and fetches from inside auxiliary area 130 via path 213 can be performed. When the current state is Inside 202, a first fetch from outside the protected range via path 214 causes a change to Outside 201. When the current state is Outside 201, fetches from outside the protected range 110 are permitted via path 215. In this example, the system may be initialized (e.g., on power up) to Inside 202 via path 216 by an initialization signal Init. This starts up the system from within a protected area. In other cases, initializing the system to Outside 201 on power up may be more beneficial.

FIG. 2 illustrates that any fetch from outside of the protected range results in a status signal Outside and any fetch from inside of the protected range, or the auxiliary area tied into the protected area, results in a status signal Inside. However, a fetch from Z_area 111 within protected range 110 changes the status signal from Outside to Inside.

Figure 3:
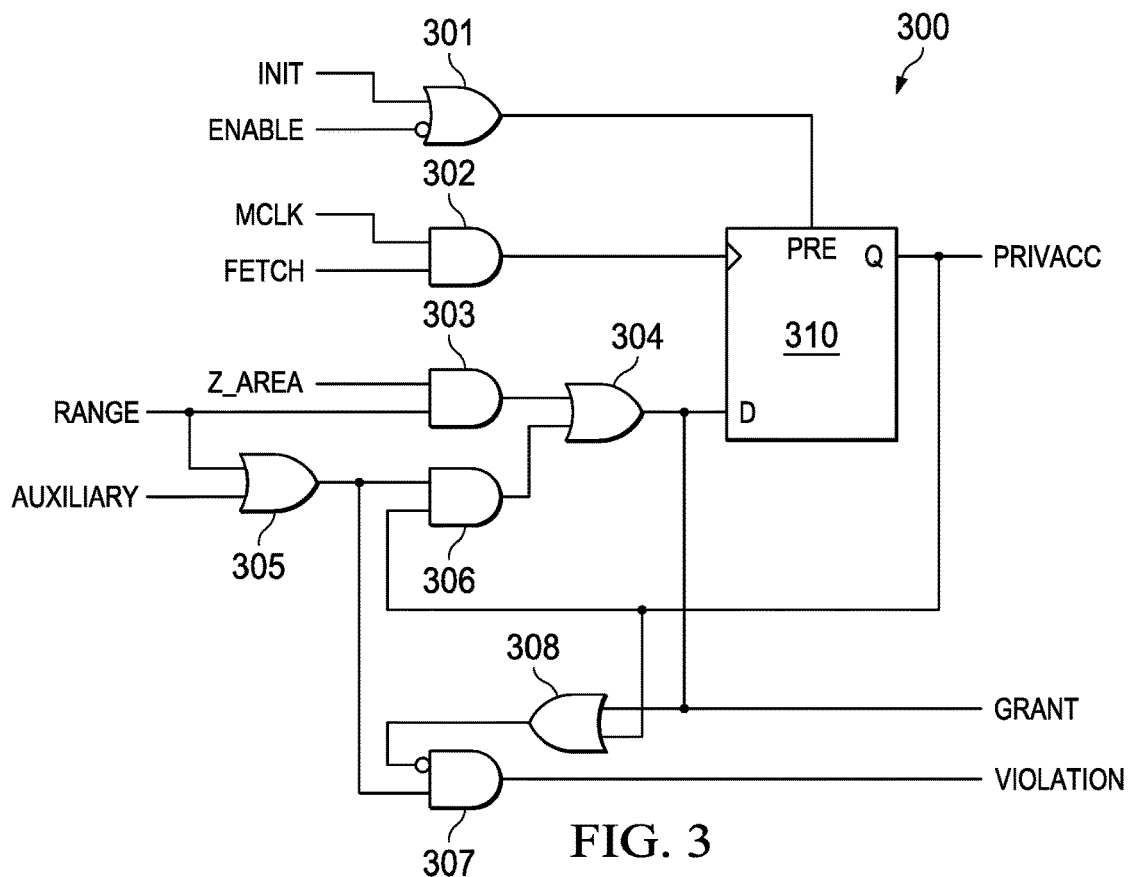
FIG. 3 is a circuit diagram of exemplary sentinel logic circuitry in accordance with an embodiment of this disclosure.

FIG. 3 illustrates sentinel logic circuitry 300. Sentinel logic circuitry 300 includes flip-flop 310 and a number of logic gates including OR gate 301, AND gate 302, AND gate 303, OR gate 304, OR gate 305, AND gate 306, AND gate 307, and OR gate 308. Flip-flop 310 has an output Q that issues a signal PrivAcc which is assimilated with the status signal in FIG. 2. A low output PrivAcc signals an Outside 201 condition and a high output PrivAcc signals an Inside 202 condition.

The following signals are used or issued by the sentinel logic circuit in FIG. 3:

Init: initializes circuit after reset;
Enable: enables protection circuit;
MCLK: main clock of CPU in a programmed device;
Fetch: High on fetch access of the central processing unit (CPU) of the system;
Range: High when protected address range is selected, usually on a module select;
Auxiliary: High when the fetched address is within a second address range that is assigned to the Range. This signal is used for protected RAM 130 that is assigned to the code executed from Range or protected peripherals. This signal is grounded low if only a single program memory block is to be protected.
Z_area: High when Protection is bypassed, usually on Z_area 113 (bottom address area) of protectable memory 110;
PrivAcc: Signals that fetch was done from within protected memory 110. Usually this signal is OR'ed together with other PrivAcc signals to generate a final privilege signal for a peripheral/memory area.
Grant: High when access to memory area is granted; and
Violation: High on access violation to protected memory area.

The state of flip-flop 310 is preset via OR gate 301. A high Init signal indicating initialization of the system sets flip-flop 310 to the Inside status via OR gate 301. A low Enable signal indicating protection is enabled sets flip-flop 310 to the Inside status via an inverting input of OR gate 301.

Flip-flop 310 is clocked to enable transitions via the output of AND gate 302. AND gate 302 is high when the clock MCLK is high and FETCH is high indicating a memory fetch by the CPU.

The signals Range and Z_area are preferably provided by an address decoder described below in conjunction with FIG. 4. While it is possible to use an address comparator, an address decoder has significant advantages in terms of reduced complexity and power consumption.

Figure 4:
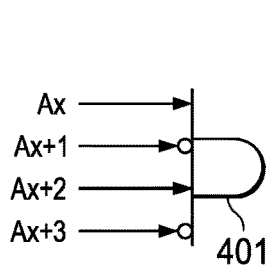
FIG. 4 is a circuit diagram of an exemplary address decoder in accordance with an embodiment of this disclosure.

FIG. 4 is an example of address decoder 400. Address decoder 400 includes a multiple input AND gate 401. In the example of FIG. 4, AND gate 401 receives inputs of most significant address bits Ax, Ax+1, Ax+3 and Ax+3 to four respective inputs. The second and fourth inputs are inverting inputs. In this example, the output Range of AND gate 401 is high for a bit pattern "1010" and low otherwise.

Returning to FIG. 3, a high Z_area value combined with a high Range value supplies a high value to the D-input of flip-flop 310 via AND gate 303 and OR gate 304. The output PrivAcc of flip-flop is fed back to the D-input via OR gate 304 and AND gate 306 when the signal Range or the signal Auxiliary is high as set by OR gate 305. Accordingly, flip-flop 310 latches an Inside condition once a fetch into Z_area 111 occurs. This remains as long as further fetches occur from inside of the protected memory area. OR gate 304 also generates a Grant signal when the address is within the protected Range and within the Z_area (as determined by AND gate 303) or the address fetch is within the Range or the Auxiliary area as determined by OR gate 305 and no grant signal is generated by OR gate 304 or flip-flop 310 is in the Inside condition as determined by the inverting input of AND gate 307. Possible responses to a Violation signal are a system reset or branching to an interrupt that calls a service routine.

Figure 5:
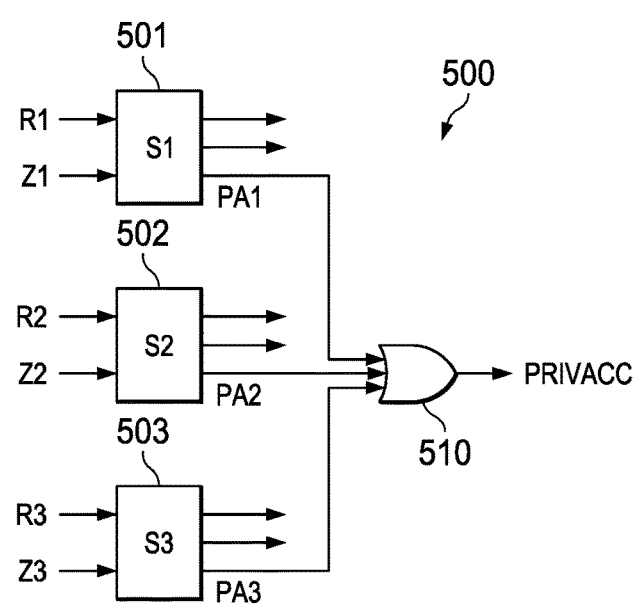
FIG. 5 is a block diagram of a logic access control circuit with three sentinel logic circuits in accordance with an embodiment of this disclosure.

In a typical application more than one protected memory area may be used. FIG. 5 shows a combination circuit 500 including three sentinel logic circuits S1 501, S2 502 and S3 503. Each sentinel logic circuit 501, 502 and 503 is associated with one out of three different protected memory areas which can be combined or nested. Each sentinel logic circuit 501, 502 and 503 has a corresponding Range signal (R1, R2 and R3) and a corresponding Z_area signal (Z1, Z2 and Z3). Each sentinel logic circuit 501, 502 and 503 may be configured as shown in FIG. 3 to issue a corresponding Grant signal and Violation signal (not labeled in FIG. 5). Each sentinel logic circuit 501, 502 and 503 may be configured as shown in FIG. 3 to issue a corresponding status signal PA1, PA2 and PA3. The status signals PA1, PA2 and PA3 (each signaling an Inside or Outside condition) are input to OR gate 510. The output of OR gate 510 is a signal PrivAcc that signals an Inside condition when high and an Outside condition when low. This is similar to the case of a single protected memory area.

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

What is claimed is:

1. An electronic device comprising:
an address decoder configured to divide an address space of a memory into a protected area that includes a first portion and a second portion and into a non-protected area; and
access control circuitry coupled to the address decoder and configured to:
permit a first instruction fetched from the non-protected area to access the first portion of the protected area without permitting access of the second portion of the protected area; and
permit a second instruction fetched from the first portion of the protected area to access the second portion of the protected area.

2. The electronic device of claim 1, wherein the protected area includes a range of addresses, the first portion is a first subset of the range of addresses, and the second portion is a second subset of the range of addresses, wherein the first and second subsets of the range of addresses do not overlap.

3. The electronic device of claim 2, wherein addresses in the second subset are higher than addresses in the first subset.

4. The electronic device of claim 1, further comprising at least one interface, the at least one interface being one of a test interface, a direct memory access interface, or an emulation interface, and wherein the access control circuitry is configured to prevent read and write operations initiated via the at least one interface from accessing the protected area.

5. The electronic device of claim 1, wherein the address decoder is configured to provide a first signal to the access control circuitry indicating whether an instruction selects an address within the protected area to access.

6. The electronic device of claim 5, wherein the address decoder is configured to provide a second signal indicating whether an instruction has been fetched from within the first portion of the protected area.

7. The electronic device of claim 6, wherein the access control circuitry is configured to assert a grant signal when the first signal and the second signal are asserted.

8. The electronic device of claim 1, wherein:
the address decoder configured to divide the address space of the memory further into an auxiliary area; and
the access control circuitry is configured to permit a third instruction fetched from the second portion of the protected area to access the auxiliary area.

9. The electronic device of claim 8, wherein the access control circuitry is configured to permit read and write access of the auxiliary area by the third instruction.

10. The electronic device of claim 8, wherein a range of addresses of the auxiliary area is not contiguous with a range of addresses of the protected area.

11. The electronic device of claim 1, wherein the access control circuitry is configured to:
permit read, write, and execute access of the first portion of the protected area by the first instruction; and
permit read, write, and execute access of the second portion of the protected area by the second instruction.

12. An electronic device comprising:
a memory including an address space;
an address decoder coupled to the memory and configured to divide the address space into a first non-protected area having a first address range, a second non-protected area having a second address range, a first protected area having a third address range, and a second protected area having a fourth address range; and access control circuitry coupled to the address decoder and configured to:

permit a first instruction fetched from the first non-protected area to access the first protected area without permitting access of the second protected area;

permit a second instruction fetched from the first protected area to access the second protected area; and permit a third instruction fetched from the second protected area to access the second non-protected area.

13. The electronic device of claim 12, wherein:

the first and second address ranges are not contiguous; and the third and fourth address ranges are contiguous.

14. The electronic device of claim 13, wherein the first and second address ranges are separated by at least the contiguous third and fourth address ranges.

15. The electronic device of claim 13, wherein:

addresses of the second address range are higher than addresses of the first address range; and addresses of the fourth address range are higher than addresses of the third address range.

16. The electronic device of claim 12, wherein the access control circuitry is configured to permit read, write, and branch access to the second non-protected area by the third instruction.

17. The electronic device of claim 12, wherein:

the address decoder is configured to further divide the address space into an auxiliary memory area; and the access control circuitry is configured to permit a fourth instruction fetched from the second protected area to access the auxiliary memory area.

18. The electronic device of claim 12, further comprising at least one input/output interface, wherein the access control circuitry is configured to prevent read and write operations initiated via the at least one input/output interface from accessing the first and second protected areas.

* * * * *